May 21, 1963 D. A. CHURCH 3,090,585
INTERRUPTED ASCENT BALLOON
Filed June 22, 1961 2 Sheets-Sheet 1

INVENTOR,
David A. Church
BY Louis Sheldon
ATTORNEY

May 21, 1963

D. A. CHURCH 3,090,585

INTERRUPTED ASCENT BALLOON

Filed June 22, 1961

INVENTOR
*David A. Church*

BY *Louis Sheldon*
ATTORNEY

United States Patent Office 3,090,585
Patented May 21, 1963

3,090,585
INTERRUPTED ASCENT BALLOON
David A. Church, Coon Rapids, Minn., assignor, by mesne assignments, to the United States of America as represented by the Secretary of the Navy
Filed June 22, 1961, Ser. No. 119,262
14 Claims. (Cl. 244—99)

This invention relates to balloons of the type designed to float at predetermined high ceiling altitudes.

For most purposes such a balloon is designed to have substantially uninterrupted ascent to its ceiling altitude, at which cosmic ray, meteorological, and other observations are made and information obtained. For some purposes, as in the case of observations to be made of an approaching or present hurricane, it is also desirable to obtain data for a desired period of time at a desired altitude considerably below ceiling altitude.

It is therefore an object of the invention to provide a balloon system capable of undergoing an interruption of its ascent and to level off and float at an intermediate altitude for a desired period of time and to thereafter resume its ascent and level off and float at its ceiling altitude.

Another object its to provide a balloon system capable of leveling off and floating at an intermediate predetermined altitude and to resume its ascent with the expenditure of only a slight amount of ballast.

A further object is to provide a balloon system which can soar at a substantially constant rate to an intermediate altitude, remain at that altitude for the desired period of time, and then resume its rise at substantially the same rate to a predetermined ceiling altitude.

An additional object is to provide a balloon system in which the lift gas is prevented from expanding in the envelope at an intermediate altitude for a desired period of time, after which expansion of the gas in the envelope is resumed and continues until the system reaches its predetermined ceiling altitude.

It is also an object to provide a novel and simple method of programming a balloon flight.

Further objects and advantages of the invention will appear as the description proceeds.

The invention will be better understood on reference to the following description and the accompanying drawing, in which.

Figure 1:
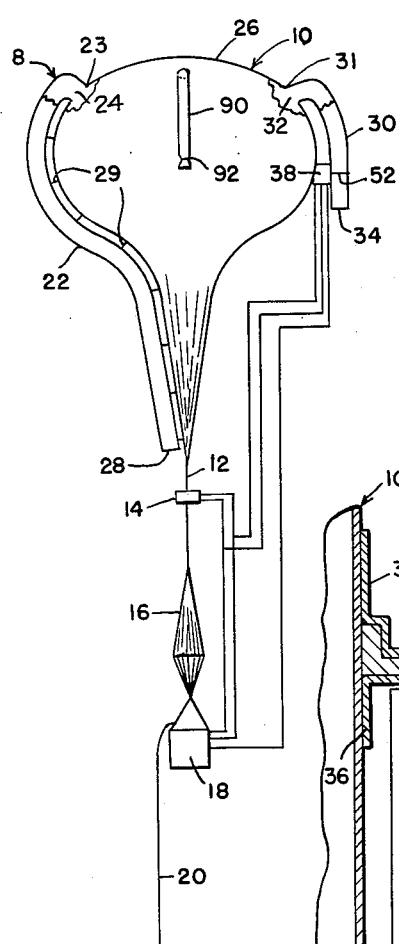
FIG. 1 is a schematic view of a balloon system floating at an intermediate level and embodying an auxiliary duct appendix, shown open, and control mechanism therefor in accordance with the invention.
Figure 5:
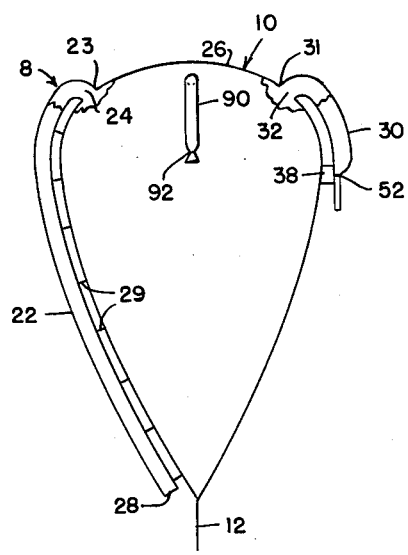
FIG. 5 is similar to FIG. 1 but shows the balloon envelope at ceiling altitude.

Referring now more particularly to the drawing, disclosing an illustrative embodiment of the invention, there is shown at 8 (FIG. 1) a free balloon system floating at an intermediate altitude and comprising a balloon envelope 10 containing helium or other lift gas, a load line 12 suspended from the envelope and passing through a load line cutter or "squib" 14, a parachute 16 suspended from the load line, and a gondola 18 suspended from the parachute and containing batteries, observational equipment, telemetering and other instruments and ballast-containing hoppers, and an antenna 20. A flexible duct appendix 22 connected at its upper end 23 to the envelope 10 extends along the outside of the envelope from an opening 24 in the top portion 26 of the envelope to a predetermined lower level, where the appendix end 28 is open to the ambient atmosphere, the appendix being connected as at 29 to the envelope lengthwise thereof.

In accordance with the invention there is provided a relatively short flexible auxiliary duct appendix 30 which extends along the outside of the envelope 10 at 31 from an opening 32 in the top portion 26 of the envelope to a predetermined lower level where the appendix end 34 is open to the atmosphere substantially above the level of the open appendix end 28.

Figure 2:
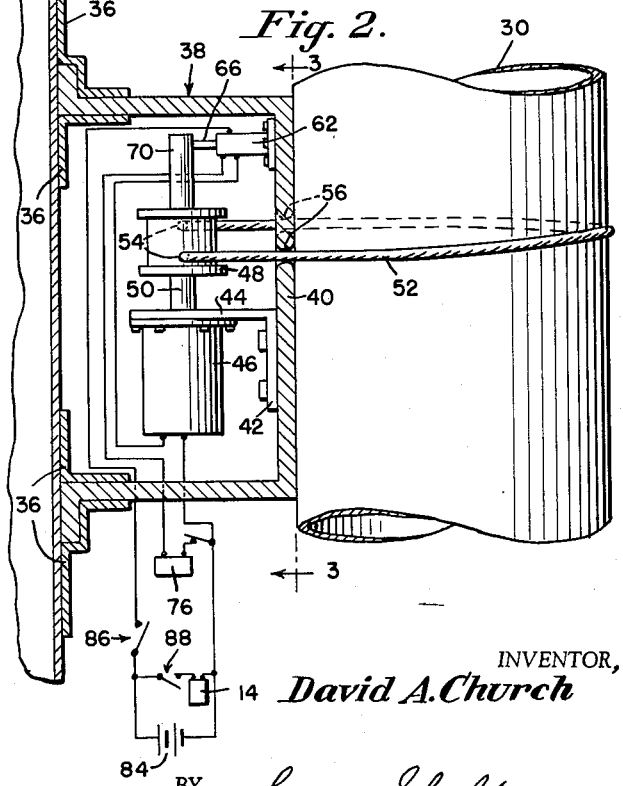
FIG. 2 is an enlarged vertical view, partly in section, of a portion of the auxiliary appendix and details of the control for the same and for the ballast.
Figure 3:
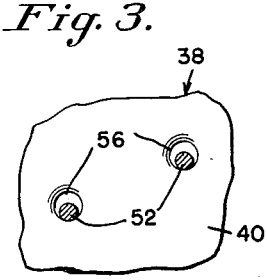
FIG. 3 is taken at 3—3 in FIG. 2.

Secured as by adhesive tape 36 or other suitable means to the outside of the envelope 10 between the envelope and the auxiliary duct 30 is a housing 38 including a rigid base 40 (FIGS. 2 and 3) adjacent the the duct. Secured to the base 40 is a bracket 42 having a resiliently yieldable cantilever arm 44 supporting a motor 46, a reel 48 being fixed to the motor shaft 50. A draw string or noose 52, attached at its ends 54 to the reel 48, passes through holes 56 in the base 40 and about the auxiliary duct 30. A casing 62 mounted on the base 40 contains a single pole double throw switch 64 (FIG. 6), having an insulator button 66 attached to its pole 67 and held by a spring 68 in engagement with the periphery of the end portion 70 of the motor shaft 50.

The gondola 18 carries, in addition to its main supply of ballast, an auxiliary and relatively small quantity of ballast in a hopper 72 (FIG. 6) having a discharge valve 74, which may be hinged, controlled by a solenoid 76. The switch contact 78 is connected to one terminal of the motor 46, and the switch contact 80 is connected to one terminal of the solenoid 76. The other terminal 82 of the solenoid 76 is a stationary contact engaging the valve 74 when the valve is latched closed by the solenoid. The valve 74 and the other terminal of the motor 46 are connected to one end of a battery 84. A timer switch 86 is connected between the other end of the battery 84 and the switch pole 67. Wiring extends from the battery 84 through a switch 88 to the squib 14.

Figure 6:
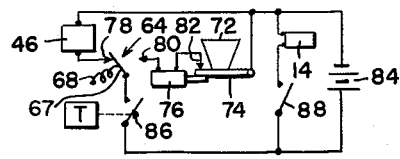
FIG. 6 is a circuit diagram in greater detail than in FIG. 2, and in the arrangement at launch of the system.

Inflation of the envelope 10 is accomplished in any suitable manner, as through an inflation tube 90 attached at one end to the upper part 26 of the envelope. When the inflation has progressed to an extent to provide the predetermined quantity of lift gas sufficient to lift the system at a predetermined rate of rise to a predetermined ultimate ceiling altitude, the inflation is terminated and the inflation tube is tied closed as shown at 92. The quantity of lift gas thus supplied is localized at and erects the upper part of the envelope, the bottom of the lift gas bubble being then substantially above the level of the open bottom 34 of the auxiliary duct 30. During inflation the duct 30 may be temporarily held down if necessary to prevent loss of lift gas therethrough to the atmosphere, and is released on completion of inflation. The load items are then attached, and the timer switch 86, now open (FIG. 6), is set to close at a predetermined time after the system 8 is expected to level off at the predetermined intermediate altitude, and then the system is launched. The motor bracket arm 44 being then unflexed, as in FIG. 2, the spring 68 holds the switch pole 67 in engagement with the motor terminal contact 78. Thus, at launching, the motor and solenoid circuits are both open, as shown in FIG. 6.

As the system 8 soars, the lift gas bubble expands due to the progressively reduced ambient atmospheric air density, with the result that the bubble bottom, which is at "zero" pressure, that is, at the same pressure as the ambient atmospheric air at the same level, descends relative to the top of the envelope and hence approaches the level of the open bottom 34 of the auxiliary duct 30. As the system 8 tends to rise to an altitude at which the bubble bottom tends to descend below the level of the open duct bottom 34, lift gas naturally exhausts to the atmosphere through the duct bottom and thus the bubble remains at substantially constant volume. Inasmuch as continued expansion of the bubble is necessary for continued ascent, the inability of the bubble to expand below the duct bottom 34 brings the ascent of the system to a halt. The location of the duct bottom is predetermined to halt the ascent at the desired intermediate altitude.

Figure 4:
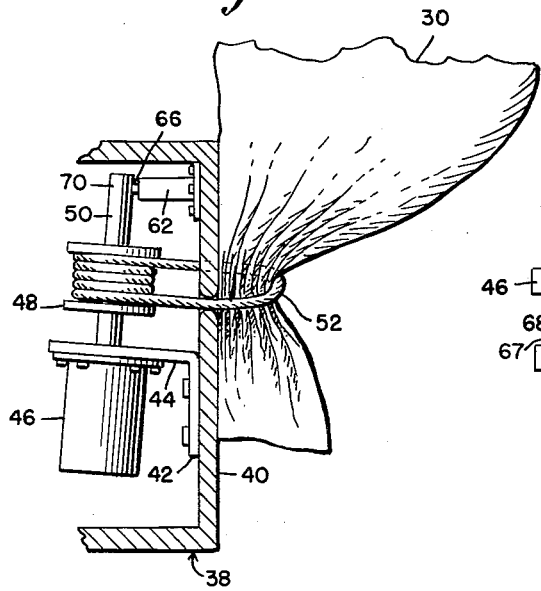
FIG. 4 is similar to FIG. 2 but shows the auxiliary appendix collapsed.
Figure 7:
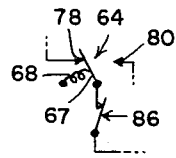
FIG. 7 is similar to a portion of FIG. 6 but shows the arrangement for collapsing the auxiliary appendix.
Figure 8:
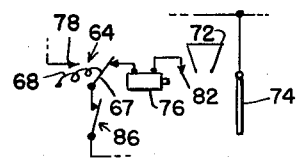
FIG. 8 is similar to FIG. 7 but shows the arrangement for triggering the ballast discharge after the auxiliary appendix is fully collapsed.

On the elapse of the preset period for the collection of the desired data by the instrumentation carried by the gondola 18 at the intermediate altitude, the timer switch 86 closes (FIG. 7). The switch pole 67 being then engaged with the motor contact 78, closing of the timer switch 86 closes the motor circuit, whereupon the motor 46 is energized and turns the reel 48, which proceeds to wind up and thereby collapse the noose 52 and consequently the duct 30 where it is encompassed by the noose. When all the slack in the noose 52 has been taken up, the continued pull thereon exerted by the reel 48 causes the motor-supporting arm 44 to flex and thus shift the motor 46 (FIG. 4), causing the motor shaft end 70 to approach the base 40 and thereby depress the switch button 66, shifting the switch pole 67 from the motor contact 78, thereby stopping the motor with the noose taut. The motor has sufficient overrun so that the shaft end 70 continues to depress the button 66 further, bringing the pole 67 into, and holding it in, engagement with the solenoid contact 80, whereupon the solenoid 76 is energized and unlatches the valve 74. The valve 74 then swings open (FIG. 8), enabling the ballast hopper 72 to discharge the small quantity of ballast to initiate resumption of ascent of the balloon system 8, which then proceeds to alternate, as it did initially at launching, to its predetermined soaring speed and then continues at that rate until ceiling altitude is reached. As the valve 74 swings open, it separates from the solenoid contact 82 and thus opens the solenoid circuit, so there is no unnecessary drain on the battery 84. During the resumed ascent the bubble expands until its bottom is at the level of the open bottom 28 of the main duct 22. Any tendency of the bubble to expand further will cause lift gas to exhaust through the duct bottom 28 to the atmosphere, with the result that the system 8 will level off at its ceiling altitude.

The system 8 may include an additional and more substantial quantity of ballast to be discharged as needed to provide lift to compensate for loss of lift such as occurs at sundown to maintain the system at ceiling altitude.

The envelope 10, ducts 22 and 30, and inflation tube 90 are preferably formed of inelastic film of which polyethylene and Mylar are examples. To maintain the bottom of the duct 30 at the lowest part of the duct, the duct may be made inherently heavy enough, or its hem weighted, to preclude the lift gas therein from doubling the duct bottom back when the system drops rising at the predetermined intermediate altitude. Such doubling back would lead to an excessive loss of gas and hence of lift, and this condition would be aggravated by the resulting descent since then the air currents would offer a drag contributing to the force acting to double back the duct.

The lower end of the duct 30 could be fastened to the envelope, but this is not preferred, since it may become necessary, during inflation, to pull the duct out of a deep fold in an uninflated part of the envelope 10.

The envelope 10 is preferably of the type in which the crown is ungathered when inflated. With this construction the partially inflated crown film at the intermediate altitude will be ungathered, i.e., skin tight, at the opening 32, so that the duct 30 thereat will be fully open and thus the intended rate of exhaust of gas through the duct to prevent the system from excessive overshooting will be possible.

The flight is terminated by firing of the squib 14 to cut the load line 12, whereupon the parachute 16 becomes operative to float the remainder of the load to earth. The squib switch 88 may be closed by pressure or timer, or from the ground or other remote point pursuant to radio command to a receiver carried by the gondola.

It is apparent from the foregoing that there has been provided a simple, effective balloon system and method of programming the ascent of a balloon system whereby the system may be halted and held at an intermediate altitude at which observations may be made and data obtained, and its ascent resumed and halted at its ceiling altitude at which observations may be made and data obtained.

The ducts 22 and 30 are of adequate diameter to discharge lift gas to the atmosphere in sufficient volume and rate to preclude the system from excessively overshooting the respective altitudes. Excessive overshooting could be prevented by discharge of ballast, but this would require a greater weight of ballast to be carried at launching. Added weight of ballast for this purpose would be highly undesirable since it would necessitate a larger balloon or a reduced weight of scientific equipment which it is desired to include in the system. With the present invention the weight of ballast necessary is minimized.

Although a preferred embodiment has been described in some detail, it should be regarded as an example of the invention and not as a restriction or limitation thereof as changes may be made in the construction and arrangement of the parts or the method without departing from the spirit and scope of the invention.

I claim:

1. In a balloon system, an inelastic film envelope, a first duct communicating with an upper part of the envelope interior and having an opening exposed to the atmosphere below said part at a predetermined level below the top of the envelope, a second duct communicating with an upper part of the envelope interior and having an opening exposed to the atmosphere at a predetermined level below the first-mentioned opening, the envelope being otherwise closed to the atmosphere, means for closing the first duct on the elapse of a period of time after the system has reached and floated at the altitude determined by the location of the opening in the first duct, and means for initiating reascent of the system when the first duct is closed to enable the system to ascend to the altitude determined by the location of the opening in the second duct.

2. In a balloon system, an inelastic film envelope, a collapsible inelastic first duct disposed outside the envelope and communicating with an upper part of the envelope interior and having an opening exposed to the atmosphere below said part at a predetermined level below the top of the envelope, a second duct communicating with an upper part of the envelope interior and having an opening exposed to the atmosphere at a predetermined level below the first-mentioned opening, the envelope being closed to the atmosphere except at said openings, means for collapsing the first duct on the elapse of a period of time after the system has reached and floated at the altitude determined by the location of the opening in the first duct, and means for initiating reascent of the system when the first duct is collapsed.

3. The structure of claim 1, characterized in that each of the ducts is of inelastic film and disposed outside the envelope.

4. The structure of claim 2, characterized in that the collapsing means comprises a noose about the duct, means for collapsing the noose, and means preventing slackening of the collapsed noose.

5. In a balloon system, an inelastic film envelope, a collapsible duct communicating with an upper part of the envelope interior and having an opening exposed to the atmosphere at a level below said part and above the envelope bottom, and means for closing the duct on the elapse of a period of time after the system has reached and floated at the altitude determined by the location of said opening, said means comprising a slack noose about the duct, means for collapsing the noose, and means for preventing slackening of the collapsed noose.

6. In a balloon system, an inelastic film envelope, a collapsible duct communicating with an upper part of the envelope interior and having an opening exposed to the atmosphere at a level below said part and above the envelope bottom, and means for closing the duct on the elapse of a period of time after the system has reached and floated at the altitude determined by the location of said opening, said means comprising a slack noose about the duct, a winch supported by the envelope and connected to the ends of the noose, means for energizing the winch for collapsing the noose, and means for deenergizing the winch with the noose collapsed.

7. In a balloon system, an inelastic film balloon envelope for containing lift gas, a collapsible duct appendix connected at one end to and there communicating with the interior of the upper part of the envelope and suspended therefrom, the lower end of the appendix being open to the atmosphere at a level substantially above the bottom of the envelope, a winch supported by the envelope, a noose slack about the appendix and connected to the winch, means for energizing the winch to collapse the noose, and means responsive to continued operation of the winch after completion of the collapse of the noose for deenergizing the winch with the noose taut.

8. In a balloon system, an inelastic film balloon envelope for containing lift gas, a collapsible duct appendix connected at one end to and there communicating with the interior of the upper part of the envelope and suspended therefrom, the lower end of the appendix being open to the atmosphere at a level substantially above the bottom of the envelope, a winch supported by the envelope, a noose slack about the appendix and connected to the winch, means for energizing the winch to collapse the noose, ballast supported by the envelope, and means responsive to continued operation of the winch after completion of the collapse of the noose for deenergizing the winch and discharging the ballast.

9. In a balloon system, an inelastic film balloon envelope for containing lift gas, a collapsible duct appendix connected at one end to and there communicating with the interior of the upper part of the envelope and suspended therefrom, the lower end of the appendix being open to the atmosphere at a level substantially above the bottom of the envelope, a winch supported by the envelope, a noose slack about the appendix and connected to the winch, ballast supported by the envelope, a release mechanism for the ballast, means including a single pole double throw switch for selectively controlling operation of the winch and release mechanism, said switch being normally connected to energize the winch to collapse the noose, and means responsive to continued energization of the winch after completion of the collapse of the noose for throwing the switch to deenergize the winch and energize the release mechanism.

10. In a balloon system, an inelastic film balloon envelope for containing lift gas, a collapsible duct appendix connected at one end to and there communicating with the interior of the upper part of the envelope and suspended therefrom, the lower end of the appendix being open to the atmosphere at a level substantially above the bottom of the envelope, a winch supported by the envelope, a noose slack about the appendix and connected to the winch, ballast supported by the envelope, a release mechanism for the ballast, means including a single pole double throw switch for selectively controlling operation of the winch and release mechanism, said switch being normally connected to energize the winch to collapse the noose, the winch being yieldably mounted so as to be flexed by the noose after the slack in the noose is taken up and the winch is still energized, the switch pole having a non-conducting tip engaged with the winch, the pole being movable in response to such flexure to deenergize the winch and energize the ballast release mechanism.

11. In a high altitude balloon system designed to float at a predetermined ceiling altitude, a balloon envelope inflatable with lift gas and having a top portion which is held ungathered by the lift gas when the system is at and above a predetermined intermediate altitude substantially below the ceiling altitude, the envelope having an opening interrupting said top portion, a collapsible film duct secured at one end to the top portion about the opening and extending from the opening outside and downward along the envelope and being open to the ambient atmosphere at its other end, said other end being located at a predetermined distance down from the top of the envelope and substantially above the bottom of the envelope, the level of said other end being the zero pressure level of the gas in the envelope when the system is at said intermediate altitude, the duct including means holding said other end at said level against the lifting force of lift gas in the duct and the drag of atmospheric air in the event of slight descent of the system from said intermediate altitude, and means for collapsing the duct after the elapse of a period of time during which the system has floated at said intermediate altitude.

12. In a high altitude balloon system designed to float at a predetermined ceiling altitude, a balloon envelope inflatable with lift gas and having a top portion which is held ungathered by the lift gas when the system is at a predetermined intermediate altitude substantially below the ceiling altitude, the envelope having an opening interrupting said top portion, a collapsible duct secured at one end about the opening and suspended outside the envelope from the opening and having a lower end open to the ambient atmosphere at a level substantially above the bottom of the envelope, a slack noose about an intermediate part of the duct, the duct below the noose hanging free, the hem of the lower end of the duct being weighted to overcome lifting thereof by the force of lift gas in the duct and by the drag of atmospheric air on slight descent of the system from the intermediate altitude and its vicinity, said level being the zero pressure level of the gas in the envelope when the system is at the intermediate altitude, means for collapsing the noose and thereby closing the intermediate part of the duct after the system has floated at the intermediate altitude for a period of time, and means for initiating ascent of the system from the intermediate altitude.

13. In a free balloon system, an inelastic film balloon envelope structure having an opening in the ambient atmosphere at a level of the envelope substantially below the top and substantially above the bottom of the envelope, the envelope being otherwise closed to the atmosphere at least down to a level substantially below the first-mentioned level, self-operating means supported by the envelope for preventing escape of lift gas from the envelope to the atmosphere at the first-mentioned level, said means being operative only on the elapse of a predetermined period after the system has ascended to the altitude determined by the position of said opening, and means responsive to the operation of the closing means for initiating resumption of ascent of the system.

14. In a free balloon system, an inelastic film balloon envelope, a duct communicating at its upper end with the upper interior of the envelope and extending downward therefrom outside the envelope and communicating at its lower end with the ambient atmosphere, the lower end being located at a level substantially above the bottom of the envelope, the duct being supported solely by the portion of the envelope above said level, self-operating means operative to close the duct only on the elapse of a predetermined period after ascent of the system to the level determined by the location of the lower end of the duct, and means responsive to the operation of the closing means for initiating resumption of the ascent.

References Cited in the file of this patent

UNITED STATES PATENTS

| | | |
|---|---|---|
| 909,397 | Godefroy | Jan. 12, 1909 |
| 2,740,598 | Van Krevelen | Apr. 3, 1956 |
| 2,742,246 | Mellen | Apr. 17, 1956 |